United States Patent
Chen et al.

(10) Patent No.: US 9,158,143 B2
(45) Date of Patent: Oct. 13, 2015

(54) DUAL PURPOSE TOUCH SENSOR PANEL AND OPTICAL RETARDER

(75) Inventors: Cheng Chen, Cupertino, CA (US);
Siddharth Mohapatra, Santa Clara, CA (US); Lili Huang, San Jose, CA (US);
John Z. Zhong, Cupertino, CA (US);
Masato Kuwabara, Tsukuba (JP)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 13/230,331

(22) Filed: Sep. 12, 2011

(65) Prior Publication Data
US 2013/0063684 A1    Mar. 14, 2013

(51) Int. Cl.
| | | |
|---|---|---|
| *G02F 1/1335* | (2006.01) | |
| *G02F 1/1333* | (2006.01) | |
| *G02F 1/13363* | (2006.01) | |
| *H04N 9/31* | (2006.01) | |
| *G06F 3/044* | (2006.01) | |
| *G06F 3/042* | (2006.01) | |

(52) U.S. Cl.
CPC ........ *G02F 1/13338* (2013.01); *G02F 1/13363* (2013.01); *G02F 1/133634* (2013.01); *G06F 3/042* (2013.01); *G06F 3/044* (2013.01); *H04N 9/3105* (2013.01); *H04N 9/3197* (2013.01); *G02F 2001/133635* (2013.01); *G02F 2001/133638* (2013.01)

(58) Field of Classification Search
CPC .......... G02F 1/13363; G02F 1/133634; H04N 9/3197; H04N 9/3105
USPC ...................................................... 349/8, 117
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| CN | 101251664 A | 8/2008 |
| JP | 2000-163031 A | 6/2000 |

(Continued)

OTHER PUBLICATIONS

International Search Report mailed Nov. 28, 2012, for PCT Application No. PCT/US2012/051912, filed Aug. 22, 2012, three pages.

(Continued)

*Primary Examiner* — Phu Vu
(74) *Attorney, Agent, or Firm* — Morrison & Foerster LLP (57) ABSTRACT

When a user operates a touch sensor panel having an LCD device outdoors or in a bright environment, light reflecting off the device can create glare. In order to reduce glare, a user can view the device through polarized filters such as polarized sunglasses. Doing so can reduce the visibility of the image displayed on the LCD. A quarter-wave retardation film can be added to the touch sensor panel's LCD device to mitigate these effects by producing circularly polarized light. However, adding a separate quarter-wave retardation film can increase the thickness and cost of manufacturing the touch sensor panel. Embodiments of the present disclosure are directed to a touch sensor panel constructed from a base film having quarter-wave retardation properties that can produce circularly polarized light. Because the base film has the desired optical properties, a separate quarter-wave retardation film may not be needed.

18 Claims, 10 Drawing Sheets

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 5,973,760 | A | 10/1999 | Dehmlow |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2002/0047969 | A1* | 4/2002 | Minakuchi ............ 349/117 |
| 2006/0026521 | A1 | 2/2006 | Hotelling et al. |
| 2006/0197753 | A1 | 9/2006 | Hotelling |
| 2006/0262255 | A1* | 11/2006 | Wang et al. ............ 349/114 |
| 2008/0204611 | A1 | 8/2008 | Matsumoto et al. |
| 2010/0118235 | A1 | 5/2010 | Zhong et al. |
| 2010/0309414 | A1* | 12/2010 | Tomonaga et al. ......... 349/96 |
| 2011/0124260 | A1 | 5/2011 | Zhong et al. |

FOREIGN PATENT DOCUMENTS

| | | |
|---|---|---|
| JP | 2002-342033 A | 11/2002 |
| JP | 2010-201659 A | 9/2010 |
| TW | 200931132 A | 7/2009 |
| TW | 201007271 A | 2/2010 |
| WO | WO-2013/039658 A1 | 3/2013 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Search Report for ROC (Taiwan) mailed Sep. 5, 2014, for TW Patent Application No. 101133376, with English translation, two page.

\* cited by examiner

DUAL PURPOSE TOUCH SENSOR PANEL AND OPTICAL RETARDER

FIELD OF THE DISCLOSURE

This relates generally to a touch sensor panel and, more particularly, to the construction of a touch sensor panel display that can be viewed by a user wearing linearly polarized filters such as polarized sunglasses.

BACKGROUND OF THE DISCLOSURE

Display screens of various types of technologies, such as liquid crystal displays (LCDs), organic light emitting diode (OLED) displays, etc., can be used as screens or displays for a wide variety of electronic devices, including such consumer electronics as televisions, computers, and handheld devices (e.g., cellular telephones, audio and video players, gaming systems, and so forth). LCD devices, for example, typically provide a flat display in a relatively thin package that is suitable for use in a variety of electronic goods including touch sensor panels. LCD technology is based on polarization optics and typically employs a linear polarizer on the front surface that emits linearly polarized light. Linearly polarized light has an electric field that vibrates in only one particular direction.

When a user operates a touch sensor panel having an LCD device outdoors or in a bright environment, light reflecting off the device can create glare. Polarized sunglasses can be worn to reduce the effects of glare by only allowing the passage of light that vibrates in a given direction (e.g., in a vertical direction). Depending on the angle that the touch sensor panel is held or oriented, the display image produced from the LCD device can appear clear, completely dark, or somewhere in between to a user wearing polarized sunglasses.

SUMMARY

When a user operates a touch sensor panel having an LCD device outdoors or in a bright environment, light reflecting off the device can create glare. In order to reduce this glare, a user can view the device through polarized filters. These polarized filters can be, for example, polarized sunglasses. Doing so, however, can reduce the visibility of the image displayed on the LCD. A quarter-wave retardation film can be added to the touch sensor panel's LCD device to mitigate these effects by producing circularly polarized light. However, the addition of a separate quarter-wave retardation film can increase the thickness and cost of manufacturing the touch sensor panel.

Various embodiments of the present disclosure are directed to a touch sensor panel constructed from a base film having quarter-wave retardation properties that can produce circularly polarized light. Because the base film has the desired optical properties, a separate quarter-wave retardation film may not be needed.

DETAILED DESCRIPTION

In the following description of preferred embodiments, reference is made to the accompanying drawings which form a part hereof, and in which it is shown by way of illustration specific embodiments that can be practiced. It is to be understood that other embodiments can be used and structural changes can be made without departing from the scope of the embodiments of this disclosure.

Embodiments of the disclosure relate to a touch sensor panel having an LCD or other device that displays an image that can be viewed through polarized filters at various angles without a significant reduction in display image quality. These polarized filters can be, for example, polarized sunglasses. LCD devices can emit linearly polarized light. When used outdoors or in a bright environment, a device housing the touch sensor panel and LCD device can reflect light and create glare. Although a user can wear polarized sunglasses to reduce the effects of glare, the visibility of the image displayed on the LCD may also be reduced. A quarter-wave retardation film can be added to the touch sensor panel's LCD device to mitigate these effects. The addition of a quarter-wave retardation film can convert the uni-directionally polarized light from the display device into circularly polarized light. However, the addition of a separate quarter-wave retardation film can increase the thickness and cost of manufacturing the touch sensor panel. In order to avoid adding a separate quarter-wave retardation film, embodiments of the disclosure are directed to a touch sensor panel constructed from a base film having quarter-wave retardation properties that can produce circularly polarized light. Because the base film has the desired optical properties, a separate quarter-wave retardation film may not be needed.

Figure 1A:
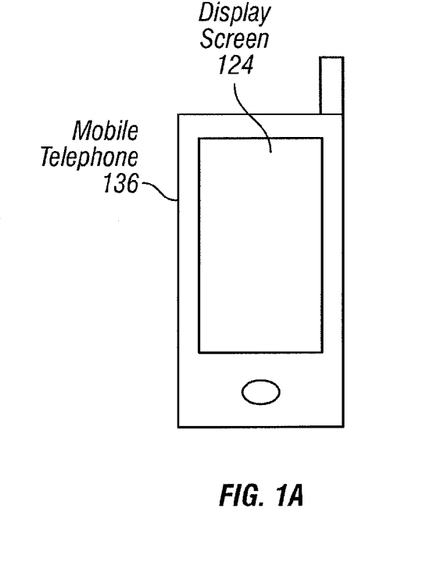
FIG. 1A illustrates an example mobile telephone according to embodiments of the disclosure.
Figure 1B:
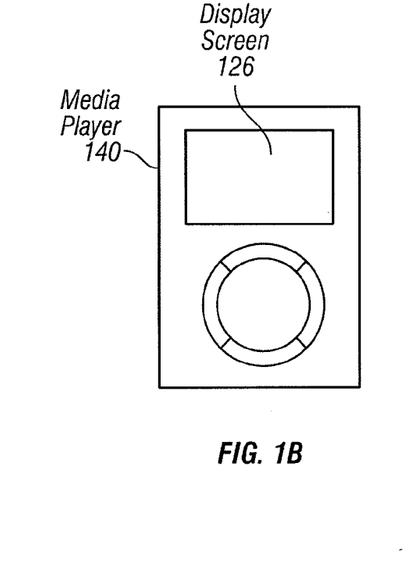
FIG. 1B illustrates an example digital media player according to embodiments of the disclosure.
Figure 1C:
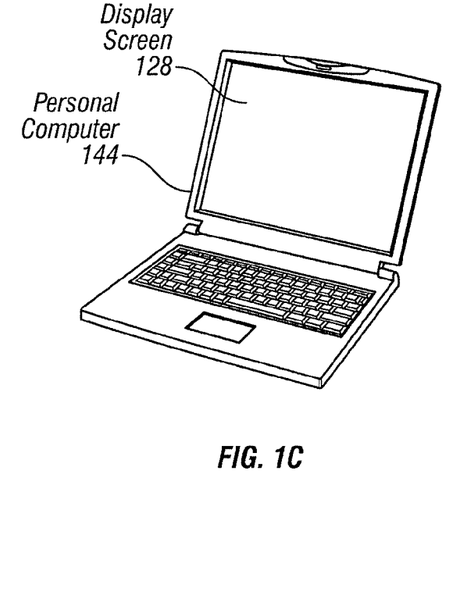
FIG. 1C illustrates an example personal computer according to embodiments of the disclosure.
Figure 1D:
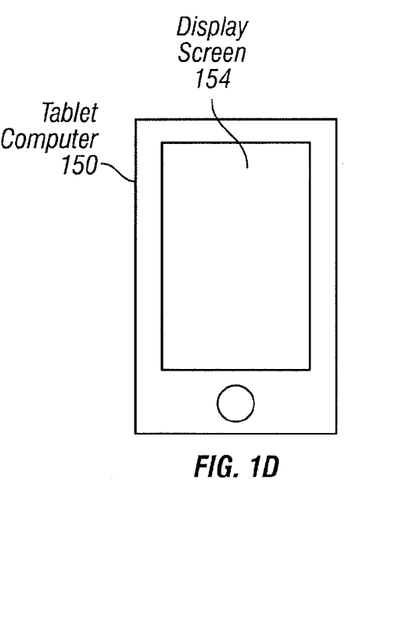
FIG. 1D illustrates an example tablet computer according to embodiments of the disclosure

FIGS. 1A-1C show example systems in which display screens according to embodiments of the disclosure may be implemented. FIG. 1A illustrates an example mobile telephone 136 that includes a display screen 124. FIG. 1B illustrates an example digital media player 140 that includes a display screen 126. FIG. 1C illustrates an example personal computer 144 that includes a display screen 128. FIG. 1D illustrates an example tablet computer 150 that includes a display screen 154. In some embodiments, display screens 124, 126, 128, and 154 can be LCD based touch screens in which touch sensing circuitry can be integrated into the display pixels to form a touch sensor panel. In other embodiments, display screens 124, 126, 128, and 154 can be OLED displays that include a polarizer and touch sensing circuitry. Touch sensing can be based on, for example, self capacitance or mutual capacitance, or another touch sensing technology. In some embodiments, a touch screen can be multi-touch, single touch, projection scan, full-imaging multi-touch, or any other type of capacitive touch sensing mechanism.

The LCD display screens in the handheld devices of FIGS. 1A-1C can emit linearly polarized light. When viewed through polarized sunglasses, the image displayed on the display screen can appear clear, completely dark, or somewhere in between. The variation in image quality can result from the use of polarized sunglasses. Polarized sunglasses only allow through light with an electric field that vibrates in a single direction (e.g., a vertical direction). As such, the quality of the image seen through polarized sunglasses can vary as the handheld device is oriented at different angles. A user wearing polarized sunglasses can perceive a deteriorated image on the display screen. This deterioration can, for example, result in the appearance of color and gray shade artifacts which can lead to a reduced or complete loss of readability. In other circumstances, a user wearing polarized sunglasses may perceive a variation in image quality as the device is rotated or tilted.

A quarter-wave retardation plate or film can be added to an LCD device to reduce the above described loss in image quality. Examples of such a quarter-wave retardation film are disclosed in U.S. Patent Publication Nos. 2010/0118235 and 2011/0124260, the contents of which are incorporated by reference herein in their entirety for all purposes.

A quarter-wave retardation film is an optical element that can alter the polarization state of a light wave traveling through it. A quarter-wave retardation film can have a higher refractive index in one direction, called the optical axis, than in the direction perpendicular to the optical axis. Light passing through the quarter-wave retardation film can vibrate along either direction. However, due to the difference in refractive indices, light polarized along the optical axis can travel through the film at a different speed than light traveling in the perpendicular direction. This difference in speed can create a phase difference. Depending on the thickness of the film, light with polarization components along both axes can emerge from the plate in a different polarization state.

Figure 2:
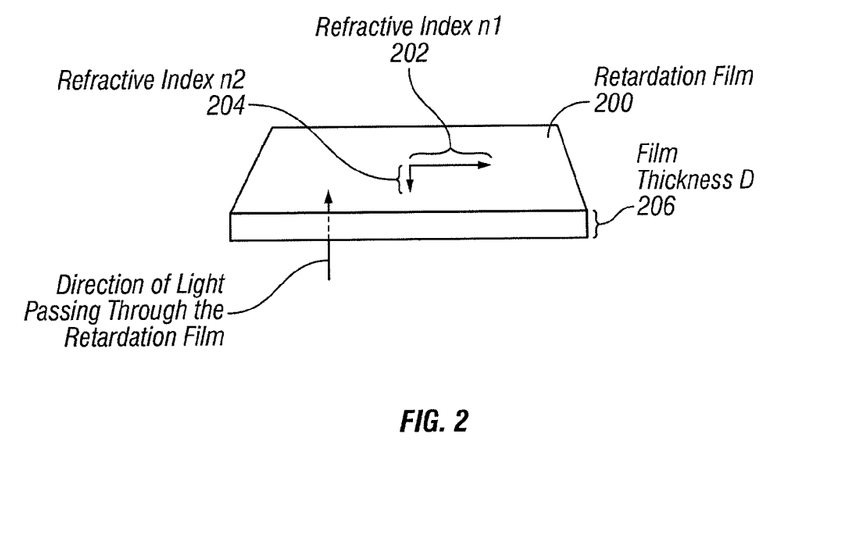
FIG. 2 illustrates an example quarter-wave retardation film according to embodiments of the disclosure.

FIG. 2 illustrates a quarter-wave retardation film 200 with film thickness D 206. The refractive index n1 202 in the direction of the optical axis can be larger than the refractive index n2 204 in a direction perpendicular to the optical axis. As light passes from the bottom of retardation film 200 through the film's top surface, the total phase shift can be substantially equal to or close to one-quarter (or substantially equal to or close to an odd number multiple of one-quarter) of the wavelength of light such that the following relationship is satisfied:

$$(n1 - n2)D = (2k - 1)\frac{\lambda}{4}$$

In the above equation, n1, n2, and D can correspond to refractive index 202, refractive index 204, and film thickness 206, respectively, as described above. λ can be the wavelength of light, preferably between 380 nm and 800 nm; and k can be any integer, preferably less than 3 in order to minimize potential artifacts caused by high retardation films. These artifacts can include, for example, a color shift or the appearance of Newton rings.

By using retardation film 200, light emitted from the top surface of film 200 can be circularly polarized. Because circularly polarized light has no angular dependence, the light and its corresponding image can remain visible even when viewed at different angles through polarized filters (e.g., sunglasses).

Figure 3:
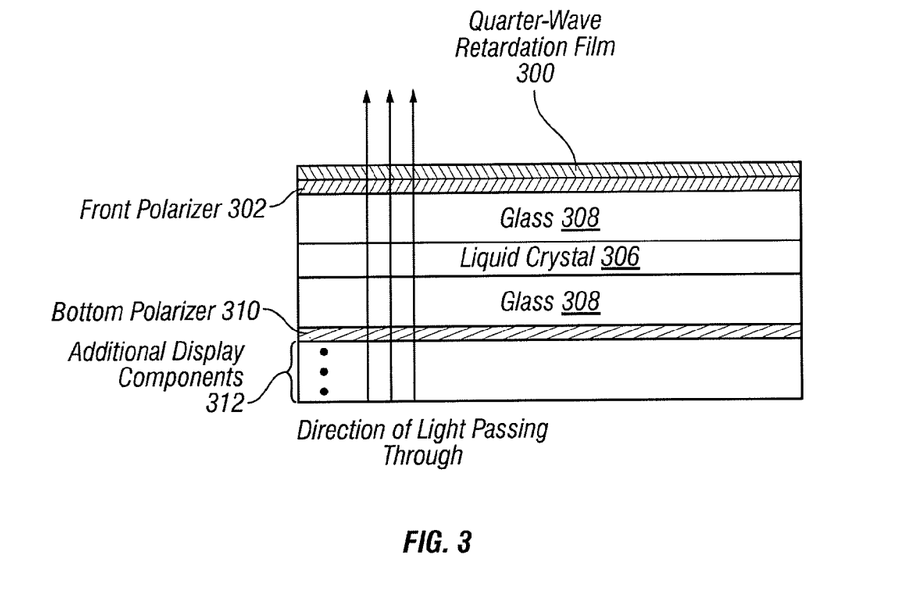
FIG. 3 illustrates an example cross sectional view of an LCD device and quarter-wave retardation film according to embodiments of the disclosure.

FIG. 3 illustrates a cross sectional view of an LCD device and quarter-wave film. The device can have a front polarizer 302, a bottom polarizer 310, and liquid crystal 306 sandwiched between two glass layers 308. Quarter-wave retardation film 300 can be placed on top of front polarizer 302. Additional display components 312 can be added depending on the type of display used and may include, for example, circuitry to control the transparency of the liquid crystal layer or a backlight that generates light that passes through the display device. The LCD device can also be integrated with an overlying touch sensor panel (not shown).

The addition of quarter-wave retardation film 300 to the LCD device can increase the cost of manufacturing the device. This cost can increase as the size of the film needed for a large LCD increases. Moreover, the addition of a separate quarter-wave retardation film 300 can increase the thickness of the device. In order to remedy these issues, embodiments of the disclosure are directed to a touch sensor panel made from a base film that can act as a quarter-wave optical retarder. Because this base film already has the desired optical properties, it can emit circularly polarized light. As such, a separate quarter-wave retardation film may not be needed.

Figure 4:
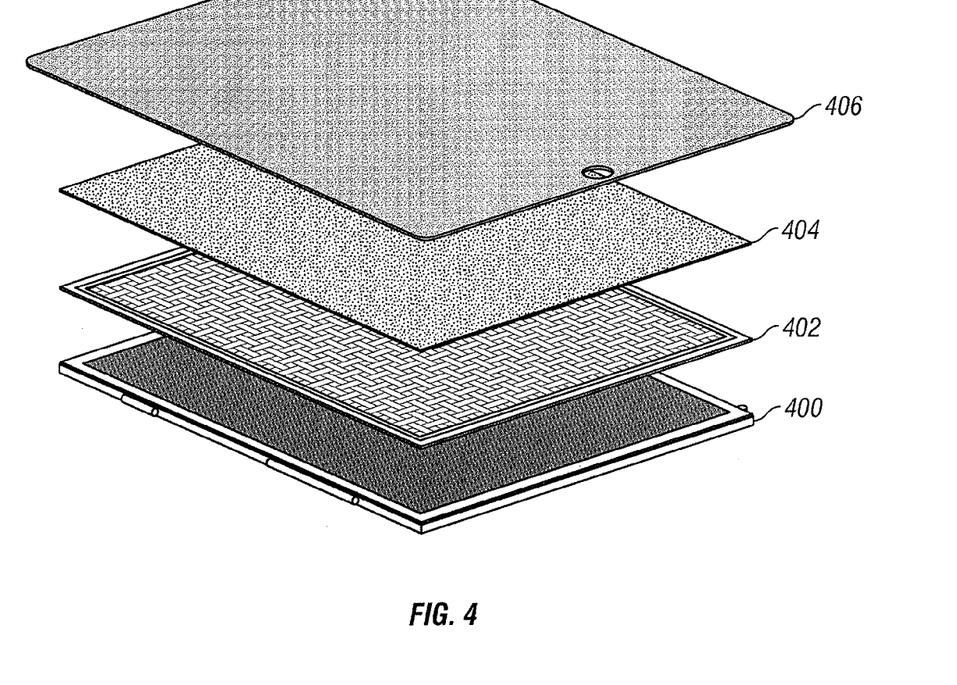
FIG. 4 illustrates an example system stack-up having a touch sensor panel that can act as an optical retarder according to embodiments of the disclosure.

FIG. 4 illustrates the stack-up of a system having a touch sensor panel that can act as an optical retarder. This system can be any of the systems illustrated in FIGS. 1A-1C, and may include a touch sensor panel integrated with a display. The stack-up can have a cover glass 406 and an adhesive or air gap 404. Touch sensor panel 402 can lie below adhesive or air gap 404. Touch sensor panel 402 can be composed of a non-conducting substrate, conducting electrodes, and other electronics as known in the art. Although the touch sensor panel can have multiple layers of substrates, at least one of these layers can be made from a base film that can act as a quarter-wave optical retarder. Display 400 can lie below touch sensor panel 402. Additional structure (not shown) may lie between any of these components.

Display 400 can be an LCD, an OLED display that includes a polarizer, or other display device. As previously explained, light emitted from an LCD device can be linearly polarized. As linearly polarized light vibrates or passes from the LCD device and through the touch sensor panel's base film, a phase shift can occur because the base film can act as an optical retarder. This phase shift can convert the linearly polarized light emitted from display 400 into circularly polarized light after it passes through the base film. Because the base film of touch sensor panel 402 can act as an optical retarder, a separate quarter-wave retardation film may not be needed. Although the above touch sensor panel is described as having a single substrate layer made from a base film that can act as a quarter-wave optical retarder, other variations are possible. In other exemplary embodiments, the touch sensor panel can have multiple layers of substrates made with a base film that can act as an optical retarder. In these embodiments, the multiple substrate layers can have a total optical retardation substantially equal to or close to one quarter-wavelength of light or substantially equal to or close to an odd number multiple of one quarter-wavelength of light.

The base film of touch sensor panel 402 can be made from the same materials used to make a quarter-wave retardation film. Typically, a touch sensor panel and quarter-wave retardation film can be made from a variety of plastics including, for example, polycarbonate (PC), cyclo-olefin polymer (COP), cyclo-olefin copolymer (COC), polymethyl methacrylate (PMMA), or cellulose triacetate (TAC). Because the same materials are used in both films, PC, COP, COC, PMMA, and TAC can also be used to manufacture a dual purpose base film having quarter-wave retardation properties. Polyethylene terephthalate (PET) can also be used to manufacture this dual purpose base film. However, PET may not be as desirable as PC, COP, COC, PMMA, and TAC because it can exhibit a large variation in the direction of the optical axis which, in turn, can affect the amount of optical retardation.

The amount of optical retardation exhibited by the base film can be affected by the orientation of the base film's optical axis relative to the polarization axis of light emitted from display 400. This orientation can depend on the type of display used. For example, when an in-plane switching (IPS) display or fringe field switching (FFS) display is used, the light emitted from the display can be linearly polarized either along a horizontal or vertical direction with respect to the touch sensor panel's edge. In order to produce circularly polarized light, the optical axis of the base film should be positioned such that it lies 45°±30° or 135°±30° from the polarization axis of the light emitted from the display. If, however, a different type of display is used (e.g., a twisted nematic LCD), then the light emitted from the display may already be polarized at a 45° or 135° angle with respect to the touch sensor panel's edge. Although any type of display may be used, the following embodiments are described with respect to an IPS or FFS display. The base film may, in some embodiments, maintain a relatively constant retardation over the entire visible spectrum of light (e.g., 380 nm-800 nm for each individual wavelength).

Figure 5:
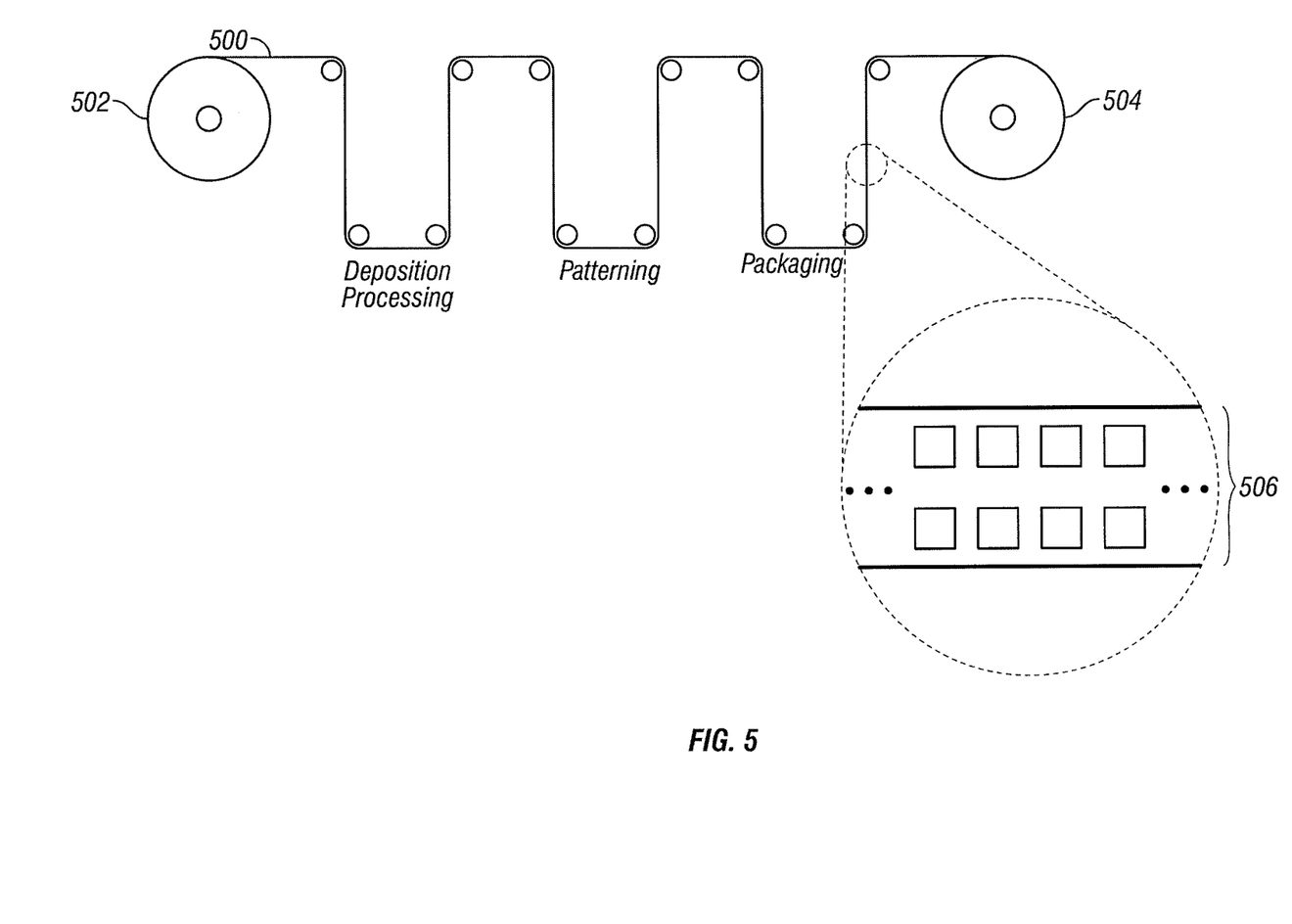
FIG. 5 illustrates an example roll-to-roll manufacturing process according to embodiments of the disclosure.

FIG. 5 illustrates an exemplary roll-to-roll manufacturing process that can be used to make the dual purpose base film of touch sensor panel 402. Roll-to-roll processing can create electronic devices from a roll of raw material 500. This raw material can, for example, be a flexible plastic like PC, COP, COC, PMMA, or TAC as described above. As raw material 500 is unwound at roller 502 and wound by roller 504, multiple touch sensor panels 506 can be formed by deposition processing, patterning circuits onto the roll, and packaging the circuits as known in the art. Once touch sensor panels 506 are formed, individual touch sensor panels can be cut out from the roll.

Manufacturing a touch sensor panel using standard roll-to-roll processing as described above, however, does not inherently create a base film having the desired quarter-wave retardation properties. According to an exemplary embodiment of the disclosure, an extra processing step may be added to impart the desired optical characteristics on the base film. As the base film is rolled out, a controlled stretch can be performed on the base film to generate the desired optical axis and the desired retardation value in the base film. The following paragraphs describe the use of a machine direction stretch, a transverse direction stretch, and a diagonal direction stretch during roll-to-roll processing to form a touch sensor panel having a base film that can act as a quarter-wave optical retarder. Although only three types of stretches are described, a person of ordinary skill in the art would recognize that other stretches may be used.

Figure 6A:
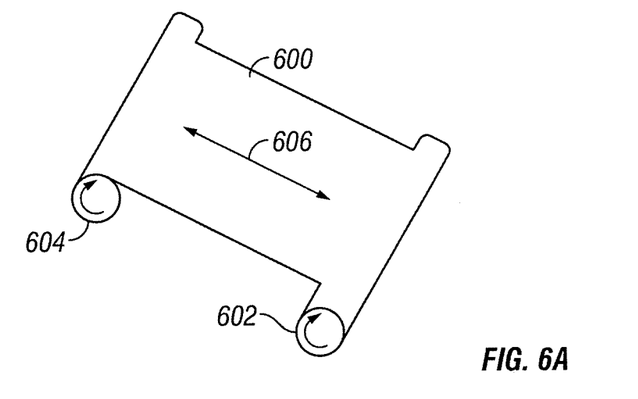
FIG. 6A illustrates the example use of a machine direction stretch during roll-to-roll processing according to embodiments of the disclosure.

FIG. 6A illustrates the use of a machine direction stretch during roll-to-roll processing. As base film 600 is rolled out from roller 604 and onto roller 602, roller 602 can operate at a higher speed than roller 604. The difference in roller speed can stretch film 600 in the machine direction. Depending on the material used in the base film, this stretch can yield an optical axis that runs either along the direction of the stretch or in a direction perpendicular to the stretch. For example, when the base film is made from PC or COP, the machine direction stretch can generate an optical axis 606 in base film 600 that runs in the direction of the stretch. It should be noted that stretching mechanisms other than the roller embodiment of FIG. 6A are also contemplated.

Figure 6B:
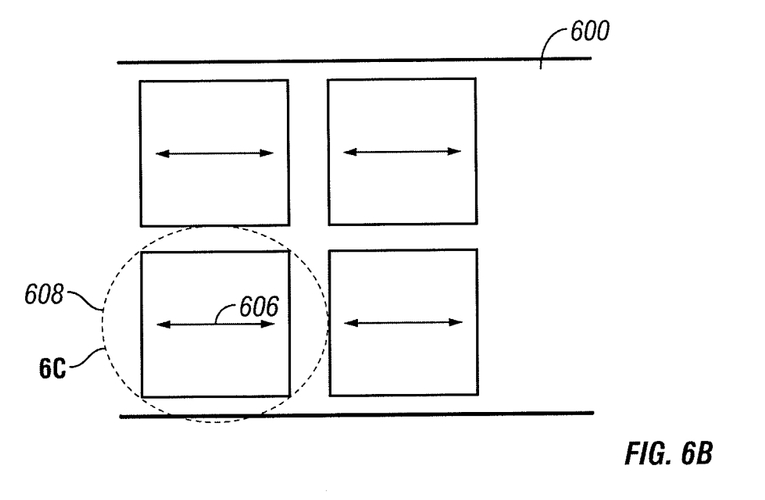
FIG. 6B illustrates an example enlarged view of a base film as it is stretched in the machine direction according to embodiments of the disclosure.

FIG. 6B illustrates an enlarged view of base film 600 as it is stretched in the machine direction. After base film 600 undergoes deposition processing, patterning, and packaging, individual touch sensor panels 608 can be cut out of the base film. Each of these touch sensor panels can have an optical axis 606 that runs in the machine direction. In this exemplary embodiment, there are two rows of touch sensor panels. In each row, the top edges of the touch sensor panels are substantially aligned with each other. Similarly, in each row, the bottom edges of the touch sensor panels are substantially aligned with each other. Although this exemplary embodiment illustrates two rows of touch sensor panels, any number of rows of touch sensor panels may be formed on base film 600.

Figure 6C:
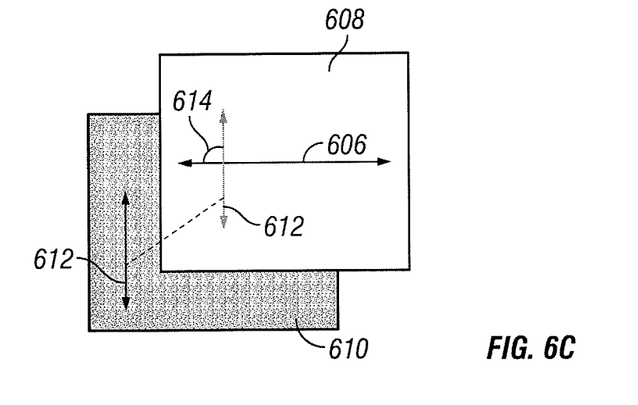
FIG. 6C illustrates an example system stack-up having a touch sensor panel and display according to embodiments of the disclosure.

FIG. 6C illustrates a stack-up that pairs touch sensor panel 608 with display 610. Display 610 can lie below touch sensor panel 608. If display 610 is an LCD, then the light emitted from the display can be linearly polarized with a polarization axis 612. When the linearly polarized light vibrates or passes through the base film of touch sensor panel 608, an angle 614 can form between the polarization axis 612 of the emitted light and optical axis 606 of the base film. As previously explained, the optical axis of the base film should be 45°±30° or 135°±30° from the polarization axis of the emitted light in order to produce circularly polarized light. In this exemplary embodiment, angle 614 formed by polarization axis 612 and optical axis 606 may not fall within the 45°±30° or 135°±30° range and, consequently, may not produce circularly polarized light. Because light passing from touch sensor panel 608 may not be circularly polarized, a user viewing the device through polarized sunglasses may perceive color and gray shade artifacts which can lead to a reduced or complete loss of readability.

In order to form the desired angle between the polarization axis of the light emitted from the display and the optical axis of the base film, the touch sensor panels can be rotated on the base film before they are cut. In an exemplary embodiment, these touch sensor panels can be rotated to form the diamond configuration of FIG. 7A. Each touch sensor panel can, for example, be rotated clockwise or counter-clockwise by 45° or 135°. Rotating the touch sensor panel may not affect the direction of the base film's optical axis 704 which runs along the direction of the machine stretch. In this exemplary embodiment, there are two rows of touch sensor panels. Unlike the configuration of FIG. 6B, the top edges of the touch sensor panels in a given row may not be substantially aligned. Similarly, the bottom edges of the touch sensor panels in a given row may not be substantially aligned. Although this exemplary embodiment illustrates two rows of touch sensor panels, any number of rows of touch sensor panels may be formed on base film 700.

Figure 7A:
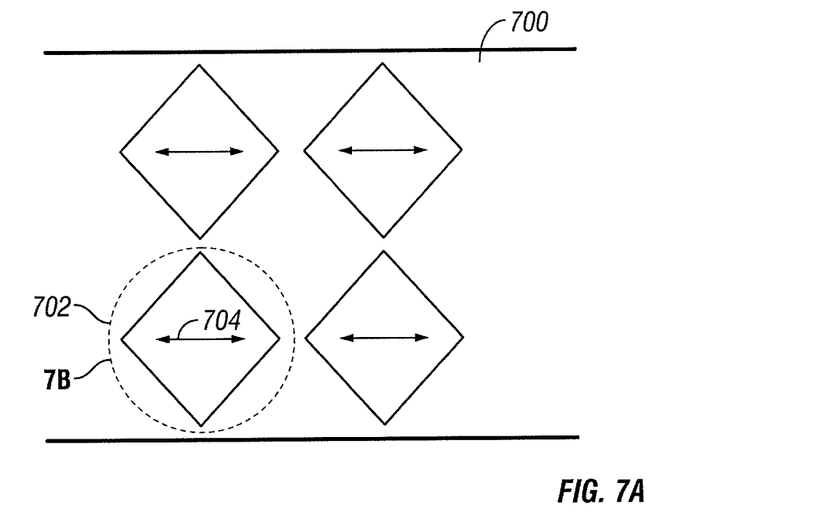
FIG. 7A illustrates example touch sensor panels that have been stretched in the machine direction and arranged in a diamond configuration according to embodiments of the disclosure.
Figure 7B:
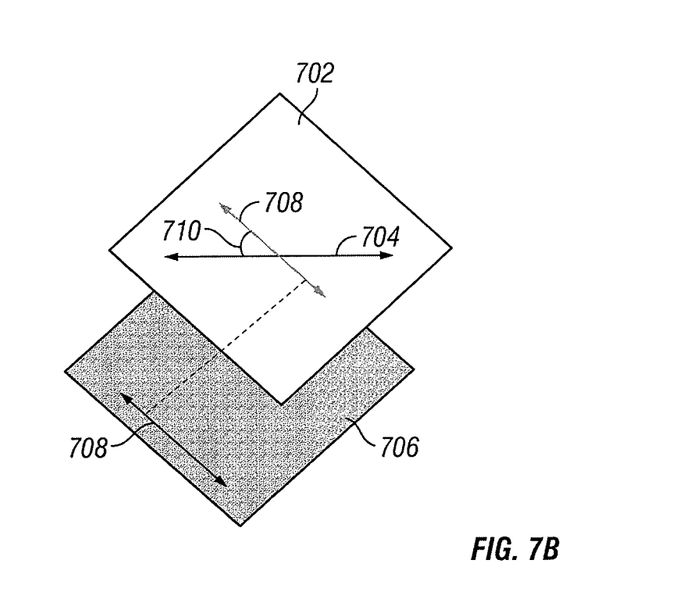
FIG. 7B illustrates an example system stack-up having a touch sensor panel and display according to embodiments of the disclosure.

FIG. 7B illustrates a stack-up that pairs display 706 with touch sensor panel 702 after the touch sensor panel has been removed from base film 700. Display 706 can be rotated in the same manner as touch sensor panel 702 such that both components lie over each other. If display 706 is an LCD, then the light emitted from the display can be linearly polarized with a polarization axis 708 that can run either along the horizontal or vertical direction with respect to the edge of display 706. When the linearly polarized light vibrates or passes through the base film of touch sensor panel 702, an angle 710 can form between the polarization axis 708 of the emitted light and optical axis 704 of the base film. Because angle 710 can fall within the desired 45°±30° or 135°±30° range in this exemplary embodiment, the base film of touch sensor panel 702 can act as a quarter-wave optical retarder that produces circularly polarized light.

Figure 8A:
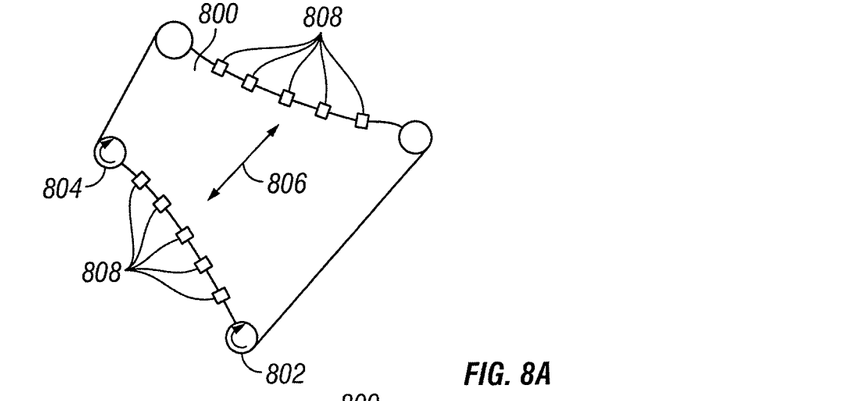
FIG. 8A illustrates the example use of a transverse direction stretch during roll-to-roll processing according to embodiments of the disclosure.

FIG. 8A illustrates another exemplary embodiment that utilizes a transverse direction stretch. As base film 800 is unwound at roller 804 and wound by roller 802, clips or other attachment mechanisms 808 can stretch material 800 in the transverse direction. This transverse direction stretch can yield an optical axis 806 in base film 800. Optical axis 806 can be perpendicular to the optical axis of a material stretched in the machine direction. It should be noted that stretching mechanisms other than the roller and clip embodiment of FIG. 8A are also contemplated.

Figure 8B:
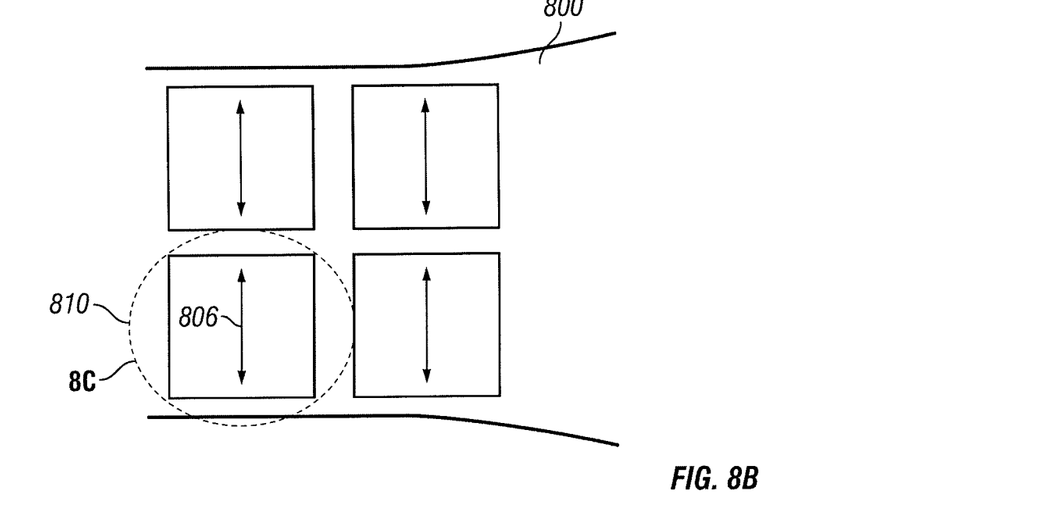
FIG. 8B illustrates an example enlarged view of a base film as it is stretched in the transverse direction according to embodiments of the disclosure.

FIG. 8B illustrates an enlarged view of stretched base film 800 after deposition processing, patterning, and packaging. Individual touch sensor panels 810 can be cut out of base film 800. Each of these touch sensor panels can have an optical axis 806 that runs in the transverse direction. In this exemplary embodiment, there are two rows of touch sensor panels. In each row, the touch sensor panels' top edges are substantially aligned with each other, and the touch sensor panels' bottom edges are substantially aligned with each other. Although this exemplary embodiment illustrates two rows of touch sensor panels, any number of rows of touch sensor panels may be formed on base film 800.

Figure 8C:
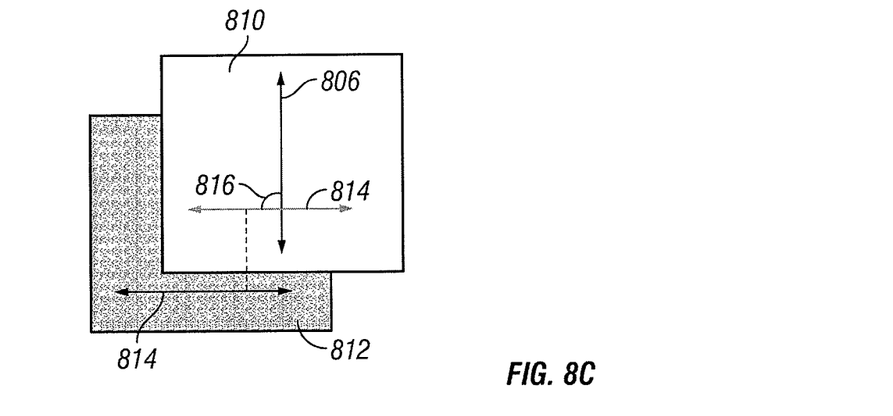
FIG. 8C illustrates an example system stack-up having a touch sensor panel and display according to embodiments of the disclosure.

FIG. 8C illustrates a stack-up that pairs touch sensor panel 810 with display 812. This configuration is similar to the configuration of FIG. 6C. If display 812 is an LCD, then the light emitted from the display can be linearly polarized with a polarization axis 814. When the linearly polarized light vibrates through the base film of touch sensor panel 810, an angle 816 can form between polarization axis 814 of the emitted light and optical axis 806 of the base film. Because angle 816 may not fall within the 45°±30° or 135°±30° range in this exemplary embodiment, the configuration of FIG. 8C may not produce circularly polarized light for reasons similar to those discussed above with respect to FIG. 6C.

Figure 9A:
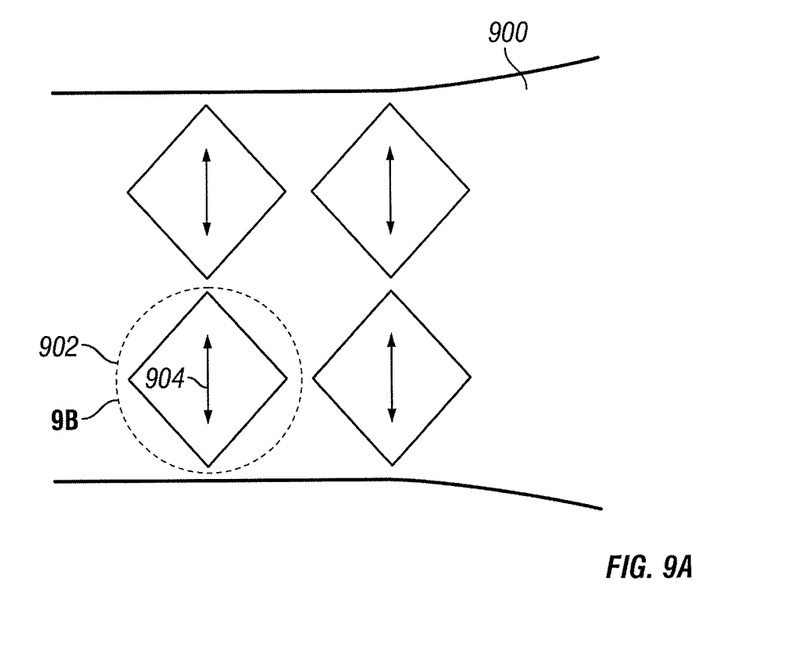
FIG. 9A illustrates example touch sensor panels that have been stretched in the transverse direction and arranged in a diamond configuration according to embodiments of the disclosure.
Figure 9B:
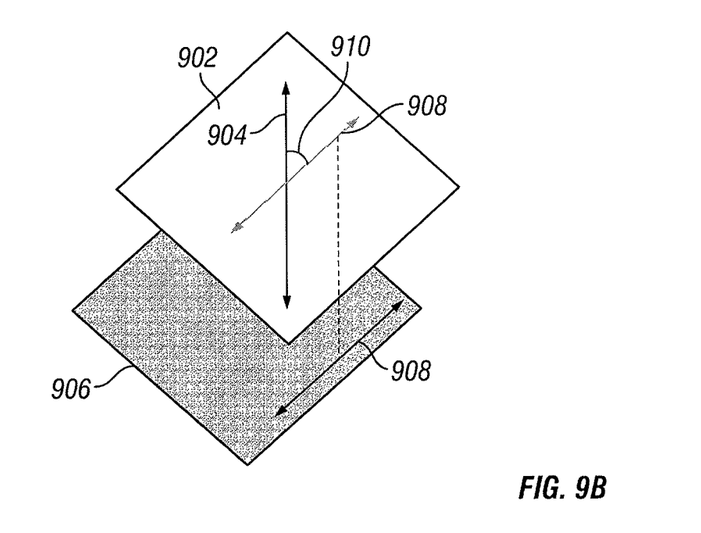
FIG. 9B illustrates an example system stack-up having a touch sensor panel and display according to embodiments of the disclosure.

As illustrated in FIGS. 9A and 9B, touch sensor panels 902 can be rotated and cut from base film 900 in a diamond configuration in order to yield the desired angle between the polarization axis of the light emitted from a LCD and the optical axis of the base film. The configuration of FIG. 9A is similar to the diamond configuration of FIG. 7A. Each touch sensor panel can, for example, be rotated clockwise or counter-clockwise by 45° or 135°. Each touch sensor panel 902 has an optical axis 904 that runs along the direction of the transverse stretch. Although this exemplary embodiment illustrates two rows of touch sensor panels, any number of rows of touch sensor panels may be formed on base film 900.

FIG. 9B illustrates a stack-up that pairs touch sensor panel 902 with display 906. Display 906 can be rotated in the same manner as touch sensor panel 902 such that both components lie over each other. If display 906 is an LCD, then the light emitted from the display can be linearly polarized with a polarization axis 908. When the linearly polarized light vibrates through the base film of touch sensor panel 902, a 45°±30° or 135°±30° angle 910 can form between the polarization axis 908 of the emitted light and optical axis 904 of the base film. This configuration can produce circularly polarized light in a manner similar to FIG. 7B.

Although the diamond configuration of FIGS. 7A, 7B, 9A, and 9B can produce circularly polarized light, this diamond pattern can yield various inefficiencies. As illustrated in these figures, the top edge of each touch sensor panel in a given row may not be substantially aligned with each other. The same may also apply to each bottom edge. In order to cut touch sensor panels from a base film using this diamond configuration, the base film should be cut at an angle. Doing so, however, can result in wasted base film. If the diamonds are cut as illustrated in FIGS. 7A and 9A, the left-over material between diamonds may not be used.

Figure 10A:
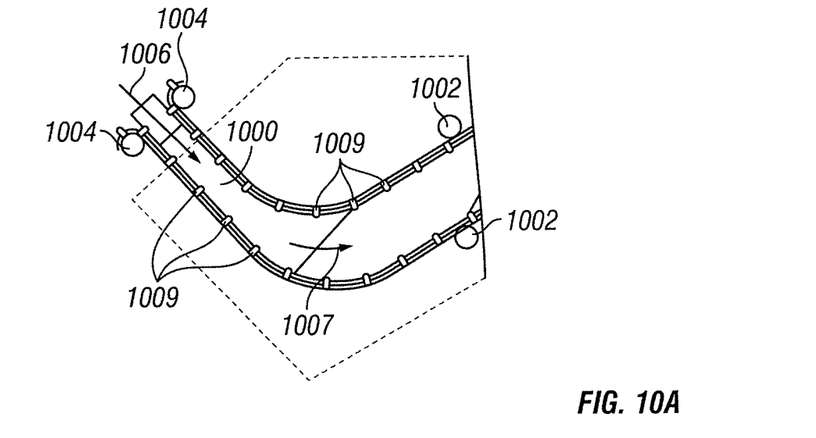
FIG. 10A illustrates the use of an example diagonal direction stretch during roll-to-roll processing according to embodiments of the disclosure.

In another exemplary embodiment, a diagonal direction stretch can be used to reduce the amount of wasted material. FIG. 10A illustrates the use of a diagonal direction stretch during roll-to-roll processing of base film 1000. A diagonal direction stretch can utilize a machine direction stretch in combination with a transverse direction stretch. Examples of producing a diagonal direction stretch are disclosed in Japanese Patent Publication No. 2010201659, the contents of which are incorporated by reference herein in its entirety for all purposes. With regard to the machine direction stretch, roller 1002 can operate at a higher speed than roller 1004 to stretch base film 1000 towards roller 1002. Arrow 1006 can represent the machine direction stretch component. With regard to the transverse direction stretch, some or all of clips or other attachment mechanisms 1009 can stretch base film 1000 in the transverse direction as the base film is rolled out. Arrow 1007 can represent the transverse direction stretch component. It should be noted that stretching mechanisms other than the roller and clip embodiment of FIG. 10A are also contemplated.

Figure 10B:
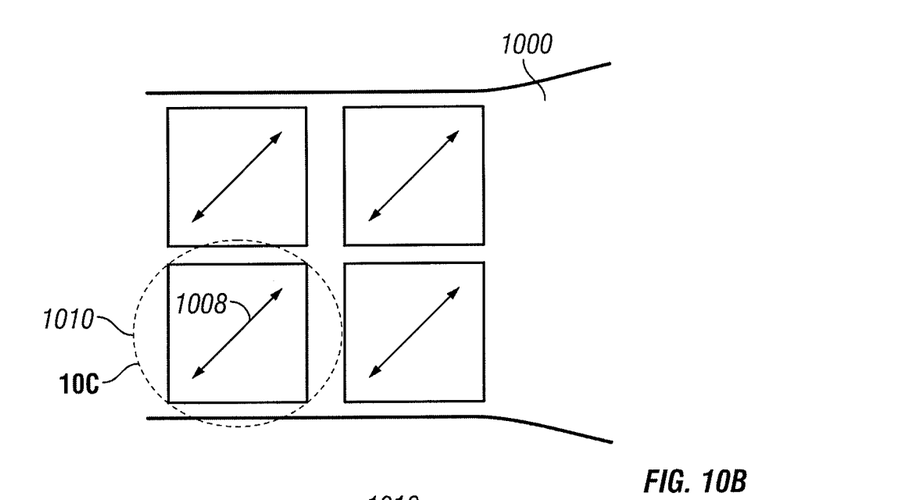
FIG. 10B illustrates an enlarged view of an example base film as it is stretched in the diagonal direction according to embodiments of the disclosure.
Figure 10C:
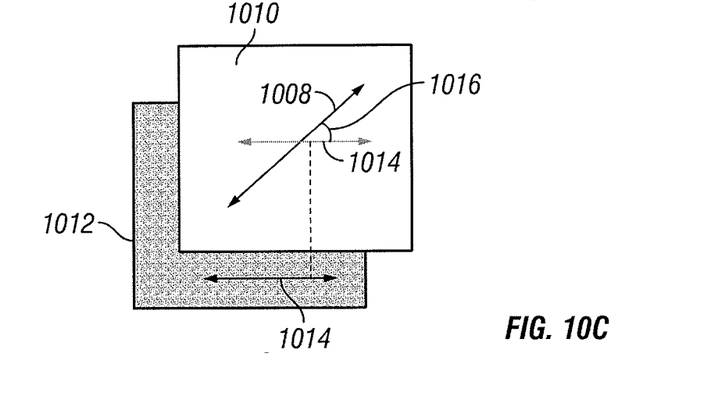
FIG. 10C illustrates an example system stack-up having a touch sensor panel and display according to embodiments of the disclosure.

FIG. 10B illustrates an enlarged view of stretched base film 1000 after it has undergone roll-to-roll processing. The diagonal direction stretch can produce an optical axis 1008 that lies at an angle substantially equal to 45° with respect to the machine direction stretch. As previously explained, the optical axis should form a 45°±30° or 135°±30° angle with the polarization axis of light emitted from a display in order to produce circularly polarized light. As illustrated in FIG. 10C, an LCD display 1012 can be placed below the cut-out touch sensor panel. Because the polarization axis of light emitted from an LCD can run along the horizontal or vertical direction of the display's edge, the desired angle can be formed by cutting touch sensor panels 1010 in rows using the configuration of FIG. 10B. Although this exemplary embodiment illustrates two rows of touch sensor panels, any number of rows of touch sensor panels may be formed on base film 1000.

FIG. 10C illustrates the resulting angle between the optical axis of touch sensor panel 1010 and the polarization axis of light emitted from display 1012 with more detail. If display 1012 is an LCD display, then polarization axis 1014 can form an angle 1016 with optical axis 1008. Because angle 1016 can fall within the 45°±30° or 135°±30° range, the base film of touch sensor panel 1010 can act as an optical retarder that can produce circularly polarized light.

The configuration of FIG. 10B can waste less material than the configurations of FIGS. 7A and 9A. By cutting the touch sensor panels 1010 from the base film as illustrated in FIG. 10B, the touch sensor panels can be positioned close to each other along base film 1000 before they are cut. This may be possible because the top edge of each touch sensor panel in a given row are substantially aligned with each other, and the bottom edge of each touch sensor panel in a given row are substantially aligned with each other. In contrast, more unused material may remain between the touch sensor panels when the touch sensor panels are cut along an angle using the diamond configuration of FIGS. 7A and 9A.

Figure 11:
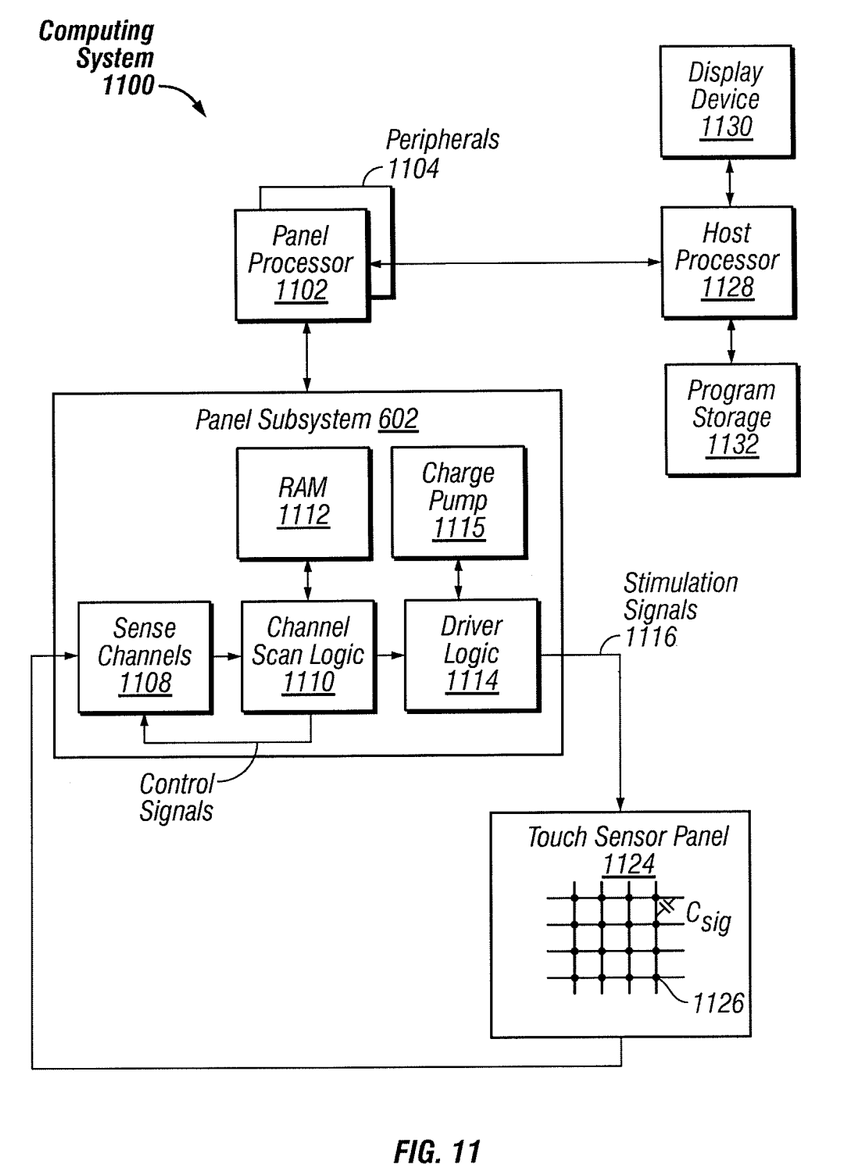
FIG. 11 illustrates an exemplary computing system utilizing a touch sensor panel that can act as an optical retarder according to embodiments of the disclosure.

FIG. 11 illustrates exemplary computing system 1100 that can include one or more of the embodiments described above. Computing system 1100 can include one or more panel processors 1102 and peripherals 1104, and panel subsystem 1106. Peripherals 1104 can include, but are not limited to, random access memory (RAM) or other types of memory or storage, watchdog timers and the like. Panel subsystem 1106 can include, but is not limited to, one or more sense channels 1108, channel scan logic 1110 and driver logic 1114. Channel scan logic 1110 can access RAM 1112, autonomously read data from the sense channels and provide control for the sense channels. In addition, channel scan logic 1110 can control driver logic 1114 to generate stimulation signals 1116 at various frequencies and phases that can be selectively applied to drive lines of touch sensor panel 1124. In some embodiments, panel subsystem 1106, panel processor 1102 and peripherals 1104 can be integrated into a single application specific integrated circuit (ASIC).

Touch sensor panel 1124 can be composed of multiple layers of substrates. These substrate layers can be made from a base film that can act as an optical retarder. As explained above, at least one of these layers should exhibit quarter-wave retardation properties. If more than one layer acts as an optical retarder, the total optical retardation should be one-quarter of the wavelength of light or an odd number multiple of one-quarter of the wavelength of light. Touch sensor panel 1124 can include a capacitive sensing medium having a plurality of drive lines and a plurality of sense lines, although other sensing media can also be used. Each intersection of drive and sense lines can represent a capacitive sensing node and can be viewed as picture element (pixel) 1126, which can be particularly useful when touch sensor panel 1124 is viewed as capturing an "image" of touch. After panel subsystem 1106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel). Each sense line of touch sensor panel 1124 can drive sense channel 1108 (also referred to herein as an event detection and demodulation circuit) in panel subsystem 1106.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A device, comprising:
a touch sensor panel disposed on a substrate; and
a display that emits linearly polarized light towards the touch sensor panel,
wherein the substrate introduces optical retardation to the light as it passes through the touch sensor panel and the touch sensor panel is oriented with respect to the display such that a 45°±30° or 135°±30° angle is formed between the optical axis in the substrate of the touch sensor panel and a polarization axis of the light emitted from the display.

2. The device of claim 1, wherein the substrate is configured such that a total amount of optical retardation introduced by the substrate is substantially equal to one-quarter of the wavelength of the light or substantially equal to an odd number multiple of one-quarter of the wavelength of the light.

3. The device of claim 2, wherein the total amount of optical retardation introduced by the substrate converts the linearly polarized light from the display into circularly polarized light.

4. The device of claim 1, wherein the substrate of the touch sensor panel is made from a material, the material selected from a group consisting of polycarbonate (PC), cyclo-olefin polymer (COP), cyclo-olefin copolymer (COC), polymethyl methacrylate (PMMA), and cellulose triacetate (TAC).

5. The device of claim 1, wherein the substrate of the touch sensor panel is formed by a controlled stretch of the substrate, the controlled stretch selected from a group consisting of a machine direction stretch, a transverse direction stretch, and a diagonal direction stretch.

6. The device of claim 5, wherein the machine direction stretch yields an optical axis in the substrate oriented along the direction of the stretch or in a direction perpendicular to the direction of the stretch.

7. The device of claim 5, wherein the transverse direction stretch yields an optical axis in the substrate oriented in a direction perpendicular to the direction of the stretch.

8. The device of claim 5, wherein the diagonal direction stretch includes a machine direction stretch component and a transverse direction stretch component, the diagonal direction stretch yielding an optical axis in the substrate oriented at an angle substantially equal to 45° with respect to the machine direction stretch.

9. The device of claim 1, wherein the display is selected from a group consisting of a liquid crystal display (LCD) and an OLED (organic light emitting diode) display that includes a polarizer.

10. A method for converting linearly polarized light into circularly polarized light in a device having a display and a touch sensor panel, the touch sensor panel having a substrate, the method comprising:
emitting linearly polarized light from the display towards the touch sensor panel;
orienting the touch sensor panel with respect to the display such that a 45°±30° or 135°±30° angle is formed between an optical axis in the substrate of the touch sensor panel and a polarization axis of the light emitted from the display; and introducing optical retardation to the light using the substrate as the light passes through the touch sensor panel, wherein the substrate of the touch sensor panel introduces the optical retardation.

11. The method of claim 10, wherein the total amount of optical retardation introduced by the substrate is substantially equal to one-quarter of the wavelength of the light or substantially equal to an odd number multiple of one-quarter of the wavelength of the light.

12. The method of claim 10, wherein the substrate of the touch sensor panel is made from a material, the material selected from a group consisting of polycarbonate (PC), cyclo-olefin polymer (COP), cyclo-olefin copolymer (COC), polymethyl methacrylate (PMMA), and cellulose triacetate (TAC).

13. The method of claim 10, wherein the touch sensor panel is formed by cutting the touch sensor panel from the substrate.

14. The method of claim 13, wherein the substrate of the touch sensor panel is formed by a controlled stretch of the substrate, the controlled stretch selected from a group consisting of a machine direction stretch, a transverse direction stretch, and a diagonal direction stretch.

15. The method of claim 14, wherein the machine direction stretch yields an optical axis in the substrate oriented along the direction of the stretch or in a direction perpendicular to the direction of the stretch.

16. The method of claim 14, wherein the transverse direction stretch yields an optical axis in the substrate oriented in a direction perpendicular to the direction of the stretch.

17. The method of claim 14, wherein the diagonal direction stretch includes a machine direction stretch component and a transverse direction stretch component, the diagonal direction stretch yielding an optical axis in the substrate oriented at an angle substantially equal to 45° with respect to the machine direction stretch.

18. The method of claim 13, wherein the controlled stretch is performed during roll-to-roll processing of the substrate.

* * * * *